US012590591B2

(12) United States Patent
Gruber et al.

(10) Patent No.: US 12,590,591 B2
(45) Date of Patent: Mar. 31, 2026

(54) MULTIPART FAN WHEEL WITH A FAN WHEEL HUB AND A PLURALITY OF FAN WHEEL BLADES FORMED SEPARATELY THEREFROM

(71) Applicant: ebm-papst Mulfingen GmbH & Co. KG, Mulfingen (DE)

(72) Inventors: Erhard Gruber, Satteldorf (DE); Oliver Haaf, Kupferzell (DE); Thorsten Pissarczyk, Gemmingen (DE); Alexander Konzal, Igersheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 18/798,923

(22) Filed: Aug. 9, 2024

(65) Prior Publication Data

US 2025/0052256 A1      Feb. 13, 2025

(30) Foreign Application Priority Data

Aug. 11, 2023    (DE) ..................... 10 2023 121 511.6

(51) Int. Cl.
| | |
|---|---|
| *F04D 29/34* | (2006.01) |
| *F04D 19/00* | (2006.01) |
| *F04D 29/32* | (2006.01) |
| *F16B 5/02* | (2006.01) |

(52) U.S. Cl.
CPC .......... *F04D 29/34* (2013.01); *F04D 19/002* (2013.01); *F04D 29/329* (2013.01); *F16B 5/02* (2013.01)

(58) Field of Classification Search
None
See application file for complete search history.

(56) References Cited

U.S. PATENT DOCUMENTS

| | | |
|---|---|---|
| 2005/0271509 A1 | 12/2005 | Chang et al. |
| 2017/0122335 A1 | 5/2017 | Kinzer |

FOREIGN PATENT DOCUMENTS

| | | | |
|---|---|---|---|
| DE | 3888865 T2 | 7/1994 | |
| GB | 635239 A * | 4/1950 | ............. F04D 29/34 |
| GB | 854690 A | 11/1960 | |
| GB | 2172936 A | 10/1986 | |

OTHER PUBLICATIONS

Liang et al (CN 104696276 A) + machine translation (Year: 2015).*
KR 20160000764 U + machine translation (Year: 2016).*
German Search Report dated Apr. 19, 2024 in corresponding German Application No. 10 2023 121 511.6.

* cited by examiner

*Primary Examiner* — Juan G Flores
(74) *Attorney, Agent, or Firm* — Harness, Dickey & Pierce, P.L.C.

(57) ABSTRACT

A fan wheel (1) with a plurality of fan wheel blades (10) and a fan wheel hub (20) can be fixed to a motor (30) in order to drive the fan wheel (1) about a rotation axis (X) that extends centrally through the fan wheel hub (20). Each of the fan wheel blades (10) can be screwed to the fan wheel hub (20) by at least one screw (41, 42). A longitudinal screw axis (L) extends parallel to the rotation axis (X). The fan wheel hub (20) has a corresponding screw receptacle (21, 22) for each of the screws (41, 42).

16 Claims, 10 Drawing Sheets

MULTIPART FAN WHEEL WITH A FAN WHEEL HUB AND A PLURALITY OF FAN WHEEL BLADES FORMED SEPARATELY THEREFROM

CROSS-REFERENCE TO RELATED APPLICATION

This application claims the benefit and priority of German Application No. 10 2023 121 511.6, filed Aug. 11, 2023. The entire disclosure of the above application is incorporated herein by reference.

FIELD

The invention relates to a fan wheel with a fan wheel hub and a plurality of fan wheel blades which are formed separately therefrom, so that the fan wheel can also be referred to as a multipart fan wheel. Since it is preferably an axial fan wheel, in such a case it can also be referred to as a multipart axial fan wheel.

BACKGROUND

Fan wheels and axial fan wheels have been known for some time from the prior art. These are often manufactured in one piece, so that the fan wheel blades and the fan wheel hub are manufactured integrally and are thus materially connected. This has the disadvantage that the configuration of the fan wheel blades cannot be changed and their orientation cannot be adjusted. In addition, the entire fan wheel must be replaced if even a single fan wheel blade is defective, as it is usually not possible to repair or replace a single blade.

Furthermore, multipart fan wheels are also known but are usually expensive to manufacture, the assembly of the fan wheel blades on the fan wheel hub is comparatively laborious.

What is more, the manner in which the fan wheel blades are fixed to the fan wheel hub sometimes does not ensure that the alignment of the blades relative to the hub remains unchanged over the entire life cycle of the fan.

For example, designs are known in which the fan wheel blades are inserted into clamping receptacles of the fan wheel hub and can be clamped or fixed in the clamping receptacles by screw connections located adjacent to the fan wheel hub. Since the fan wheel blades are able to partially rotate about a respective longitudinal axis relative to the hub, an unwanted twisting of the fan wheel blades in the clamping mounts relative to the fan wheel hub can occur over time or when an above-average force is applied and, accordingly, an adverse inflow to the fan wheel blades can occur.

Moreover, variants are already known in which the fan wheel blades are each screwed to the fan wheel hub using a screw. However, a provision is usually made in such cases that the screws are screwed in along an axis that is tilted relative to the rotation axis, which makes both the manufacture of the hub and the assembly of the blades on the hub complex and expensive.

SUMMARY

It is therefore the object of the invention to overcome the aforementioned disadvantages and provide a fan wheel which is simple to manufacture and can be adjusted to various operational scenarios or uses.

This object is achieved by the combination of features according to claim 1.

A fan wheel, in particular an axial fan wheel, with a fan wheel hub and a plurality of fan wheel blades formed separately therefrom and from one another is therefore proposed according to the invention. The fan wheel hub can be fixed to a motor in order for the fan wheel to be driven rotationally about a rotation axis extending centrally through the fan wheel hub or the rotor thereof. The fan wheel hub can be connected to the rotor via a rotor flange, it being possible for the rotor flange to be an integral part of the rotor. The fan wheel hub can also be molded directly onto the rotor or the rotor flange, or fan wheel hub can be molded around the rotor or rotor flange. Each of the fan wheel blades can be screwed, i.e., fixed by a screw connection, to the fan wheel hub by means of at least one screw with a longitudinal screw axis extending parallel to the rotation axis, the fan wheel hub having a corresponding screw receptacle for each of the screws for screwing to the fan wheel blades, the respective longitudinal axis of which screw receptacle also extends parallel to the rotation axis.

Although screws are expressly mentioned, a threaded rod with associated nuts or alternative fastening means can also be used, for example, provided that a main joining direction of a respective fastening means and the associated receptacle extends parallel to the rotation axis and the respective fastening means are suitable for fixing the fan wheel blades to the fan wheel hub in accordance with the load.

By virtue of the fact that at least one and preferably all screw receptacles extend parallel to the rotation axis, the manufacture thereof or the manufacture of the fan wheel hub as well as the assembly of the fan wheel blades on the fan wheel hub is especially simple, since the fan wheel hub does not have to be realigned for the assembly of each individual screw and for the creation of each individual screw receptacle.

Furthermore, according to an advantageous variant, at least one of the screw receptacles of the fan wheel hub associated with a fan wheel blade is embodied as a blind hole extending parallel to the rotation axis in which an internal thread corresponding to the respective screw is provided or which is designed to cut an internal thread corresponding to the respective screw, in particular by means of a self-tapping screw. In a case in which the fan wheel hub is made of plastic, the internal thread in the blind hole can also be provided, for example, by a metal body which is introduced into the plastic and which can optionally correspond to a metal insert as explained below.

Additionally or alternatively thereto, according to another variant, at least one of the screw receptacles associated with a fan wheel blade is embodied as a through hole extending parallel to the rotation axis in which an internal thread corresponding to the respective screw is provided or which is designed to cut an internal thread corresponding to the respective screw, in particular by means of a self-tapping screw. As an alternative to a through hole having an internal thread, a provision can also be made that a contact surface is provided on the through hole for direct or indirect contact and fixation to a connecting body having an internal thread, in which case the contact surface can be formed in particular by the fan wheel hub or by a metal insert as explained below. The connecting body can, for example, be a nut or the motor or the rotor thereof for rotationally driving the fan wheel. If the through hole is provided by a metal insert, this can also be embodied as a spacer, enabling a distance defined in the axial direction to be set between the respective fan wheel blade and the connecting body, in particular the rotor.

For the mounting of each of the fan wheel blades on the fan wheel hub, two screw receptacles are preferably provided for each fan wheel blade, it being possible for both to be embodied as blind holes, both as through holes, or one as a blind hole and one as a through hole.

For each fan wheel blade or, for example, for every other fan wheel blade as viewed in the circumferential direction, a screw receptacle is preferably embodied as a through hole for screwing to the motor or the rotor thereof, so that not only can the respective fan wheel blade be fixed to the fan wheel hub by means of the respective screw receptacle, but the fan wheel blade and fan wheel hub can also be fixed together to the motor or the rotor thereof.

According to an advantageous embodiment, a provision can also be made that the motor for rotationally driving the fan wheel further comprises a rotor flange which can be fixed to the rotor or formed integrally therewith. In terms of assembly design, the rotor flange could also be associated with the fan wheel. In such a variant, at least some of the fan wheel blades, for example every second fan wheel blade in the circumferential direction, and preferably all of the fan wheel blades, can be screwed to the fan wheel hub and the rotor flange or the rotor at the same time by means at least one of the screws with the screw longitudinal axis extending parallel to the rotation axis, or they are designed to be screwed to the fan wheel hub, in particular to extend through the same, to the rotor flange or the rotor. Accordingly, the fan wheel hub is arranged in a sandwich-like manner between the fan wheel blade and the rotor flange and is fixed therebetween by screwing the fan wheel blade to the rotor flange, it being possible in particular for the fixation to be frictional and/or form-fitting. During the mounting of the fan wheel blades on the fan wheel hub, the fan wheel is, correspondingly, mounted integrally on the rotor or motor.

As already mentioned, the motor has a rotor, and the fan wheel hub can also be integral and, more particularly, formed in a single piece with the rotor. For example, the rotor can be overmolded or cast with the fan wheel hub, which is made in particular of plastic. In such a case, the rotor could also be added to the fan wheel in terms of assembly design.

Variants with material pairings in which the fan wheel blades are made of plastic and the fan wheel hub is made of metal, or vice versa, are especially advantageous. It is also possible for both the fan wheel blades and the fan wheel hub to be made of plastic or metal.

If the fan wheel blades are made of plastic, a provision is preferably made that at least one screw feedthrough is embodied as a metal insert for passing through one of the screws and for stabilizing the respective screw and/or the fan wheel hub. Accordingly, such a metal insert can provide a contact surface for contact with the fan wheel hub and/or a contact surface for a screw head of a respective screw.

If the fan wheel hub is made of plastic, a provision is preferably made that the screw receptacles are each embodied as a metal insert and for contact with a respective fan wheel blade and/or the rotor or rotor flange of the motor.

In order to simplify assembly and achieve automatic alignment of the fan wheel blades with respect to the fan wheel hub during assembly, a provision is made according to an advantageous embodiment of the fan wheel that at least one first centering element, embodied as a dome, for example, is provided on the fan wheel hub for each fan wheel blade, and a corresponding second centering element, embodied as a depression, for example, is provided on the fan wheel blades as an assembly aid and/or centering aid for fastening the fan wheel blades to the fan wheel hub in a low-backlash or backlash-free manner.

Preferably, the centering elements can already achieve a frictional and/or form-fitting connection of the fan wheel blades to the fan wheel hub in at least one direction, for example in the circumferential direction.

The first centering elements and/or the corresponding second centering elements can also be provided on the respective metal inserts and/or formed integrally with the respective metal inserts. The centering elements are preferably designed to be centric to the respective screw holes, more particularly blind or through holes.

Preferably, the first centering elements are each embodied as domes and the corresponding second centering elements as depressions, or vice versa. The domes and the corresponding depressions have a cylindrical, conical or truncated cone-shaped basic shape. Additionally or alternatively, the domes and the corresponding depressions are each shaped and dimensioned in such a way that the screw connection by means of the screws creates a frictional and/or form-fitting connection exclusively between their respective lateral surfaces or exclusively between their respective front top surfaces, meaning that they are in force-loaded contact with each other.

If the domes and the recesses each have a conical or truncated cone-shaped basic shape and are in contact with each other exclusively at their lateral surfaces, the fan wheel blades are automatically aligned during assembly with respect to a predetermined position in a plane orthogonal to the rotation axis.

If the domes and the recesses are only in contact with each other at their top surfaces, the fan wheel blades are automatically aligned or brought into a predetermined position in the axial direction, i.e., along the rotation axis, during assembly.

To further simplify assembly, at least one particularly integrally formed spring element can be provided on the fan wheel hub for each fan wheel blade and/or on the fan wheel blades by means of which a respective centering element and, in particular, a respective dome can be pre-mounted in a respective recess, i.e., held by spring force until fixed by the screws, and/or aligned, i.e., brought into a position by spring force.

An especially advantageous refinement of the fan wheel makes a provision that the fan wheel hub, at a front end or an end face that is impinged by flow during operation on which the fan wheel blades are to be mounted, has a wave-shaped profile in the axial direction along the rotation axis, i.e., a profile that varies in the axial direction, which is formed by alternating sections of positive gradients and negative gradients.

Furthermore, fastening portions for screwing the fan wheel blades to the fan wheel hub are preferably provided exclusively in the sections with positive pitch or exclusively in the sections with negative pitch. At least one of the screw receptacles is provided in each of the fastening portions, so that exactly one fan wheel blade can be fixed to the fan wheel hub in each fastening portion.

Preferably, the front surface of the fastening portions faces in a predetermined direction of rotation, so that the fan wheel blades fixed to the fastening portions are pressed against the fastening portions during rotation in the predetermined direction of rotation.

The fastening portions can have a step-like profile in which the positive gradient or the negative gradient is interrupted by a section lying in a plane without a gradient, in which case the at least one screw receptacle of the fastening portion can be provided in this section without a gradient.

An especially advantageous variant makes a provision that each of the fan wheel blades can be screwed to the fan wheel hub by means of at least two screws with a longitudinal screw axis extending parallel to the rotation axis, in which case the screw receptacles for screwing a fan wheel blade to the fan wheel hub each provide a contact surface, in particular on the front side, which lie in different planes orthogonal to the rotation axis, so that the fastening portions each have a step-like or multi-stage profile, particularly when viewed in a section about the rotation axis.

In order to optimize the flow in the axial direction, i.e., along the rotation axis, an advantageous further refinement makes a provision that the fan wheel hub has intermediate regions in the circumferential direction between the fastening portions, with exactly one intermediate region being provided between each two fastening portions. The intermediate regions are each designed to minimize flow resistance against a flow extending in the axial direction along the rotation axis. In particular, a provision can be made that the intermediate regions each have recesses and/or bevels and/or roundings for optimizing the flow in the axial direction. Particularly in the cross section from radially inside to radially outside, i.e., in the radial direction outward, sloping bevels can be provided at the intermediate regions which pass via a rounding into a radially outward-facing lateral surface of the fan wheel hub, so that a flow impinging in the axial direction is guided radially outward largely free of flow obstacles and correspondingly minimized flow resistance in the intermediate regions.

Preferably, the fan wheel hub has a wall which completely surrounds the rotation axis in the circumferential direction, is delimited radially outwardly by a lateral surface facing away from the rotation axis, and extends at the end face having the wave-shaped profile over the fastening portions and intermediate regions inwardly in the radial direction, i.e., toward the rotation axis.

In order to mark and/or encode a starting position for the assembly of the fan wheel blades on the fan wheel hub and, if necessary, to determine an assembly sequence or to enable a specific assembly position to be specified for each fan wheel blade, corresponding indexing elements can be provided on at least one of the fan wheel blades and on the fan wheel hub which are designed to assign a specific position on the fan wheel hub to a specific fan wheel blade.

Besides their mere allocational function, the indexing elements can also be embodied as coding elements, enabling a respective fan wheel blade to only be mounted in one position with the corresponding element. Such an indexing element can be embodied as a pin, for example, or as a plurality of pins in a predetermined arrangement relative to one another.

Furthermore, at least one stop can be formed on the fan wheel hub for each fan wheel blade and/or on each of the fan wheel blades which limits the displaceability of the fan wheel blades when mounted on the fan wheel hub in the circumferential direction and, in particular, counter to the predetermined direction of rotation. As a result, the at least one stop can be used to determine a position of a fan wheel blade on the fan wheel hub or on a respective fastening portion of the fan wheel hub and to align the respective fan wheel hub, in particular with respect to the screw receptacles.

The fan wheel blades can each have a connecting portion for screwing to the fan wheel hub which preferably corresponds to the fastening portions of the fan wheel hub and, in particular, forms a radially inner end portion of the fan wheel blades. The connecting portions are formed in cross section with point symmetry with respect to a longitudinal axis of a respective fan wheel blade that extends orthogonally to the rotation axis, each around a point that is centrally located in the cross section of the respective connecting portion, wherein the point is in particular the center of area or the geometric center of gravity. By virtue of such a point-symmetrical design, the fan wheel blades can be mounted on the fan wheel hub both with a first side of the connecting portions as well as an oppositely situated second side of the connecting portions facing toward the fan wheel hub, so that the fan wheel blades can be turned around in order to reverse the direction of conveyance or mounted in a flipped position. If the fan wheel blades have metal inserts, these can form the respective connecting portions or at least be part of the connecting portions.

The features disclosed above can be combined as required, provided this is technically possible and they do not contradict one another.

Further areas of applicability will become apparent from the description provided herein. The description and specific examples in this summary are intended for purposes of illustration only and are not intended to limit the scope of the present disclosure.

BRIEF DESCRIPTION OF DRAWINGS

Other advantageous refinements of the invention are characterized in the subclaims and/or depicted in greater detail below together with the description of the preferred embodiment of the invention with reference to the figures.

DETAILED DESCRIPTION

Figure 1:
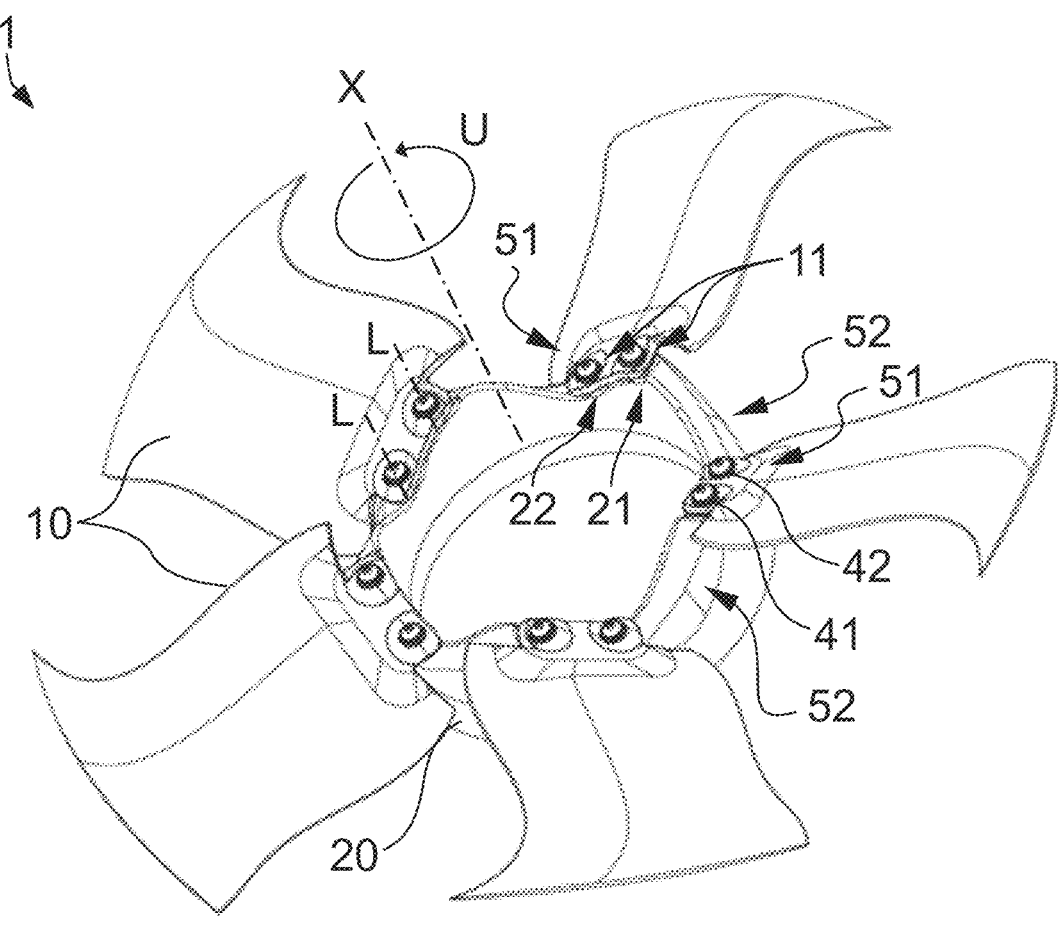
FIG. 1 shows a perspective view of a fan wheel.

The figures are diagrammatic examples. Identical reference numerals in the figures indicate identical functional and/or structural features.

FIG. 1 shows a fan wheel 1 with a fan wheel hub 20 arranged centrally around the rotation axis X and a plurality of fan wheel blades 10 mounted thereon.

As proposed, each of the fan wheel blades 10 is mounted on the fan wheel hub 20 by means of two screws 41, 42, the fan wheel hub 20 having a respective screw receptacle 21, 22 for each of the screws which is designed to receive the screws 41, 42 with a longitudinal screw axis L extending parallel to the rotation axis X.

Accordingly, the screws 41, 42 can be guided in a simple manner through screw feedthroughs provided for this purpose through the fan wheel blades 10 which are formed, for example, by metal inserts 11 and screwed in parallel to the rotation axis X, it also being possible for the through holes or blind holes that define the screw receptacles 21, 22 to be formed in a simple manner parallel to the rotation axis X without requiring a tilting of the fan wheel hub 20 relative to the rotation axis X.

Figure 2:
FIG. 2 shows a side view of the fan wheel according to FIG. 1.
Figure 2:
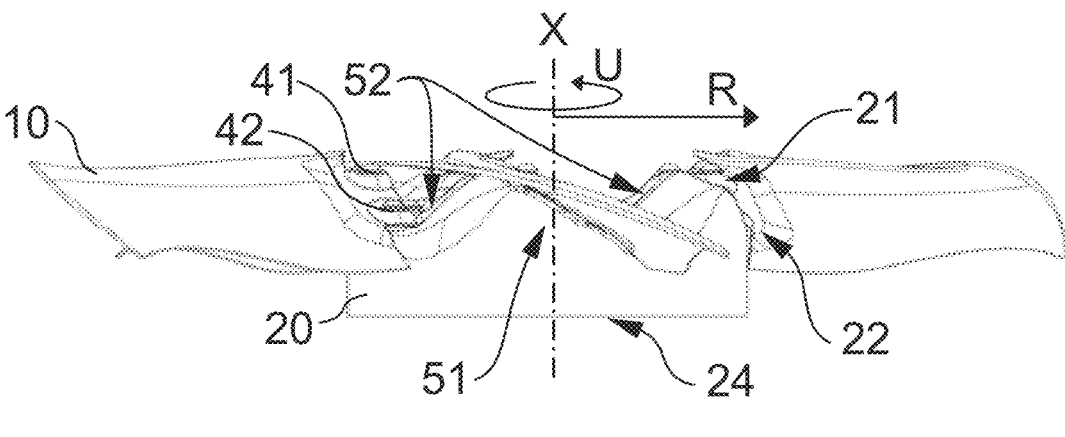

In FIG. 2, the fan wheel 1 is shown in a side view, making the wave-shaped and stepped profile of the fan wheel hub 20 on its front side particularly clear. On the front side on which the fan wheel blades 10 are mounted on the fan wheel hub 20, the fan wheel hub 20 has a wave-shaped profile in which fastening portions 51, in each of which two screw receptacles 21, 22 are provided, and intermediate portions or intermediate regions 52 located therebetween alternate, these regions having mutually opposing gradients.

As also shown and described in detail with reference to the following figures, the two screw receptacles 21, 22 for a fan wheel blade 10 are each located in mutually different planes E1, E2, so that the fastening portions 51 are stepped along the profile of the rotation axis X.

Figure 2A:
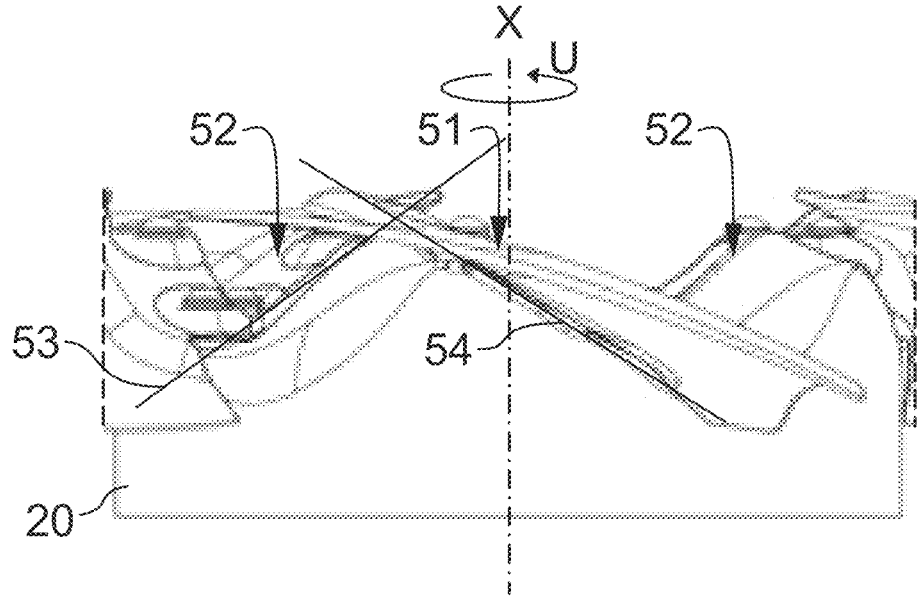
FIG. 2a shows a detailed view of the fan wheel according to FIG. 2.

To illustrate the wave-shaped profile, the fan wheel hub 20 according to FIG. 2 is shown in enlarged form in FIG. 2a. In addition, an associated slope 54 is shown for the fastening portions 51, and an associated slope 53 is shown for the mutually oppositely situated intermediate regions or intermediate portions 52. Relative to the predetermined direction of rotation according to the arrow drawn in the circumferential direction U, the slope 53 of the intermediate portions 52 is positive and the slope 54 of the fastening portions 51 is negative. As a result, as the fan wheel 1 rotates as intended about the rotation axis X in the circumferential direction U in an counter-clockwise direction, as is also shown schematically in FIGS. 1 and 2, the fan wheel blades 10 are pressed accordingly against the fastening portions 51 or the fan wheel hub 20, so that the forces acting in the circumferential direction U during rotation are not absorbed and intercepted by the screws 41, 42, but rather directly by the fan wheel hub 20.

Figure 3:
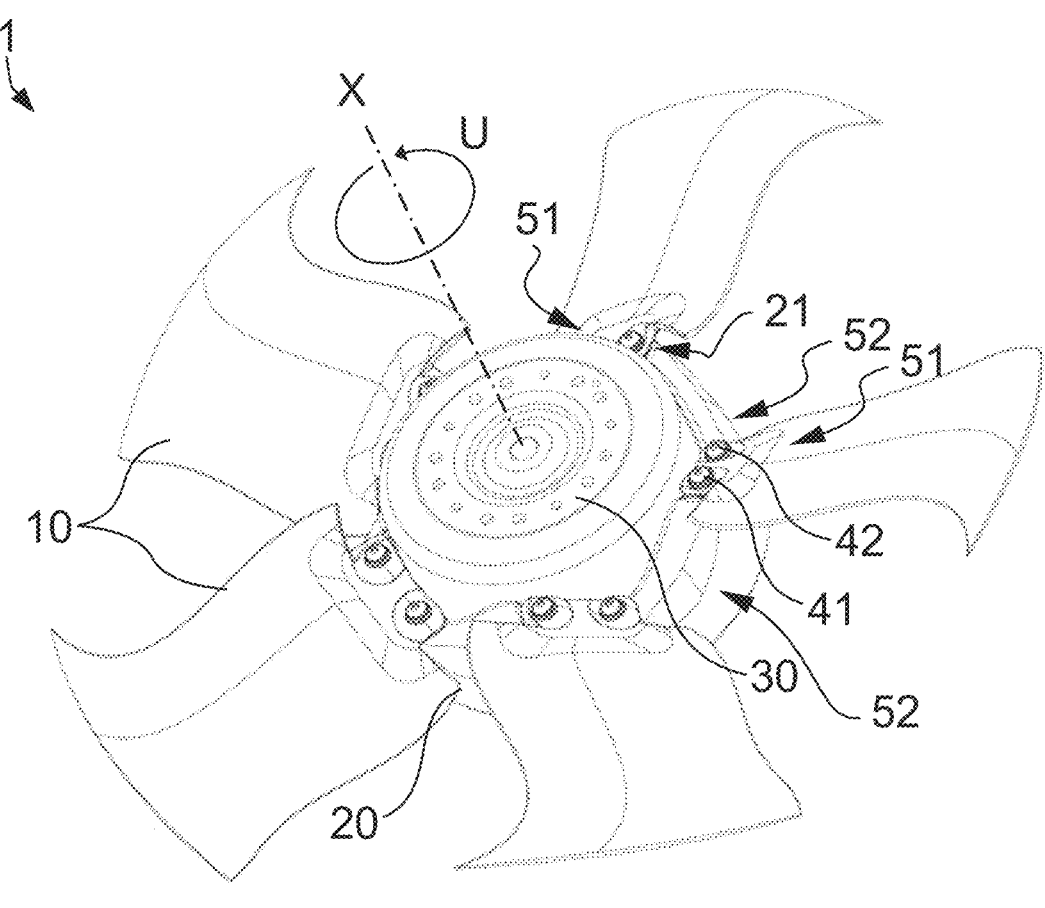
FIG. 3 shows a perspective view of a fan wheel mounted on a motor.
Figure 4:
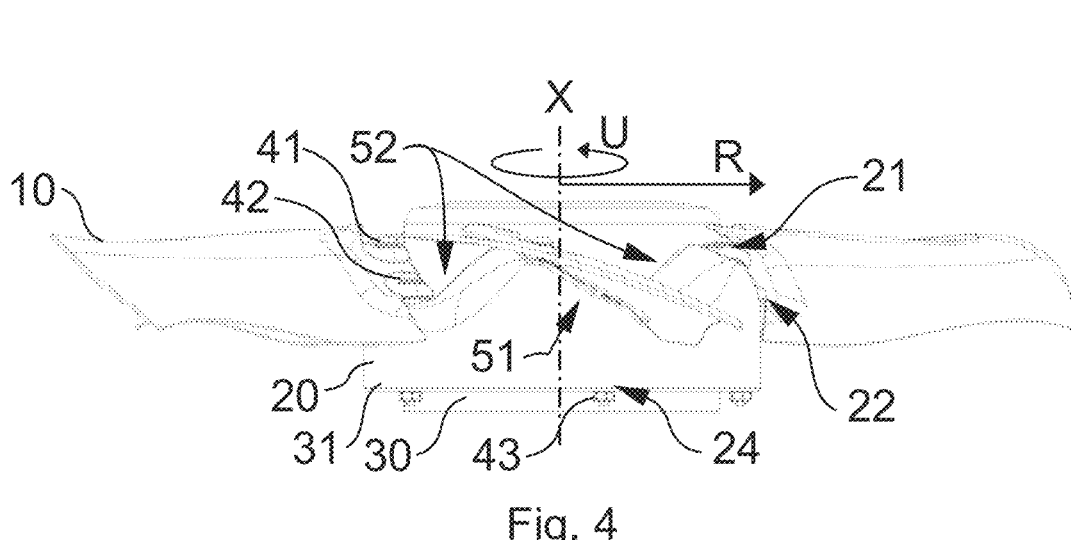
FIG. 4 shows a side view of the fan wheel according to FIG. 3.

FIGS. 3 and 4 correspond substantially to FIGS. 1 and 2, with the fan wheel 1 being mounted on a motor 30 or comprising the rotor of a motor 30 or a rotor flange 31 for connecting the fan wheel 1 to the rotor of the motor 30.

In particular, such a rotor flange 31 is visible in FIG. 4, the fan wheel hub 20 resting on the rotor flange 31 in the axial direction and providing a contact surface 24 therefor.

As described in greater detail with reference to the other figures, the two screw receptacles 21, 22 which are associated with a respective fan wheel blade 10 are designed differently from one another, with a first of the screw receptacles 21 serving to fix a respective fan wheel blade 10 to the fan wheel hub 20 and a second of the screw receptacles 22 simultaneously serving to fix the fan wheel blade 10 to the fan wheel hub 20 and to fix it to the rotor flange 31 or to the rotor of the motor 30. For this purpose, the associated screw 42 cooperates with a nut 43 and clamps the fan wheel hub 20 in a sandwich-like manner between a respective fan wheel blade 10 and the rotor flange 31.

Figure 5:
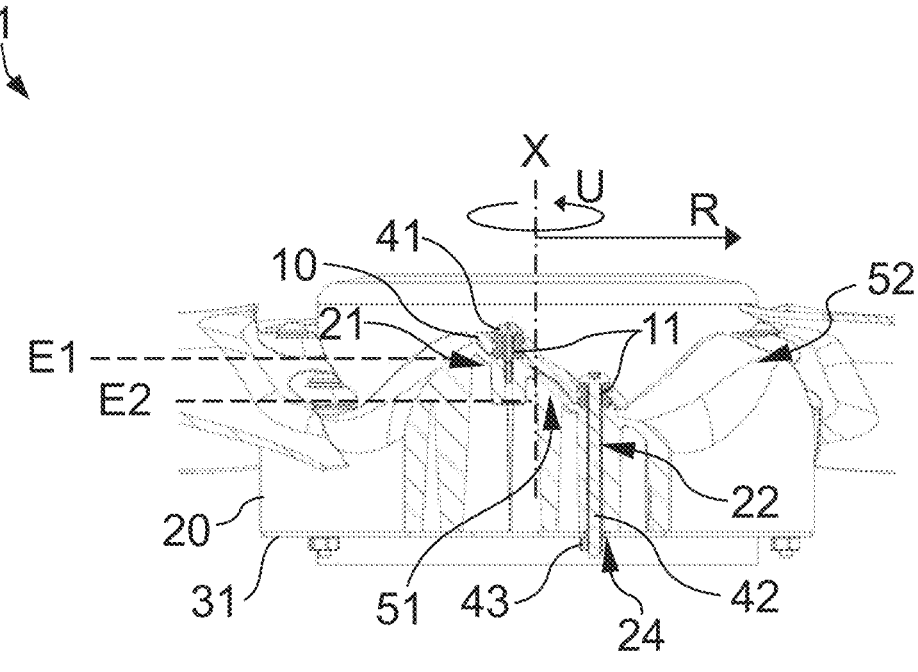
FIG. 5 shows a section through the fastening portion of the fan wheel according to FIGS. 1 to 4.
Figure 6:
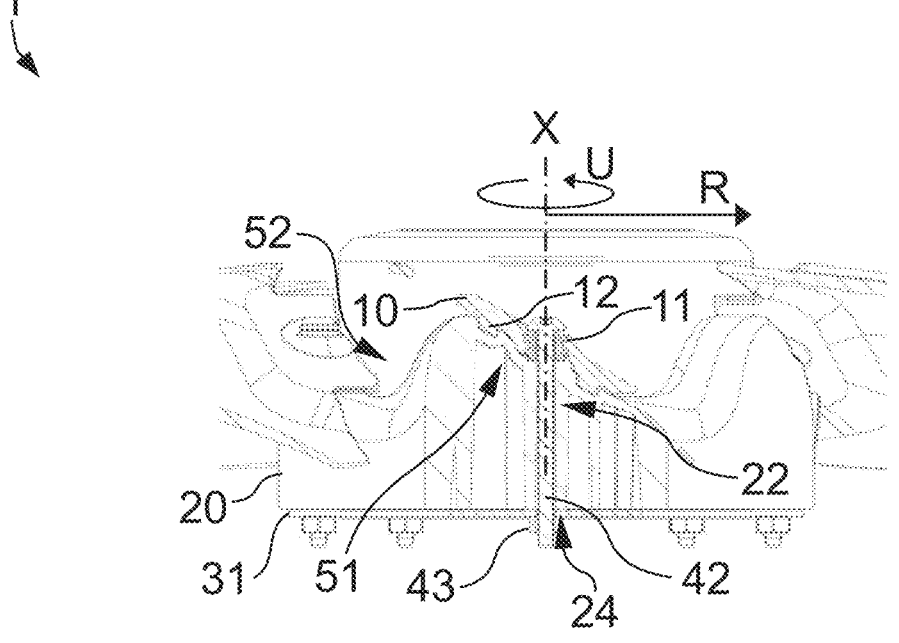
FIG. 6 shows a section through a fastening portion of an alternative variant of a fan wheel.

In FIGS. 5 and 6, two different variants of a fan wheel 1 are shown in a respective sectional view through a respective fastening portion 51, the variant according to FIG. 5 corresponding to the fan wheel 1 according to FIGS. 1 and 2 or 3 and 4. In each case, a provision is made that the fan wheel hub 20 is made of metal and the blades 10 are made of plastic; for an improved and, in particular, load-appropriate connection, two metal inserts 11, each forming a screw feedthrough through which the respective screws 41, 42 are guided, are inserted into the blades 10 and particularly overmolded.

As can be clearly seen in the sectional view according to FIG. 5, the screw receptacle 21 lies in a first plane E1 and the second screw receptacle 22 in a second plane E2, the screw receptacles 21, 22 each being embodied as a hole extending parallel to the rotation axis X. The screw receptacle 21 is provided as a blind hole and the screw receptacle 22 as a through hole, so that the screw 41 can be screwed into an internal thread provided in the screw receptacle 21 and the screw 42 can be passed through the screw receptacle 22 and screwed to the nut 24 in order to fix the fan wheel hub 20 to the rotor flange 31.

Deviating from this, in the variant according to FIG. 6, only a single screw receptacle 22 is provided per fastening portion 51 or per fan wheel blade 10, this screw receptacle 22 being designed, analogously to the variant according to FIG. 5, as a through hole for fixing the fan wheel blade 10 to the fan wheel hub 20 and for fixing the fan wheel hub 20 to the rotor flange 31. In order to ensure that the fan wheel blade 10 does not rotate in the circumferential direction U, additional retaining elements 12 are provided which fix the fan wheel blade 10 with respect to its position in the circumferential direction U.

Figure 7:
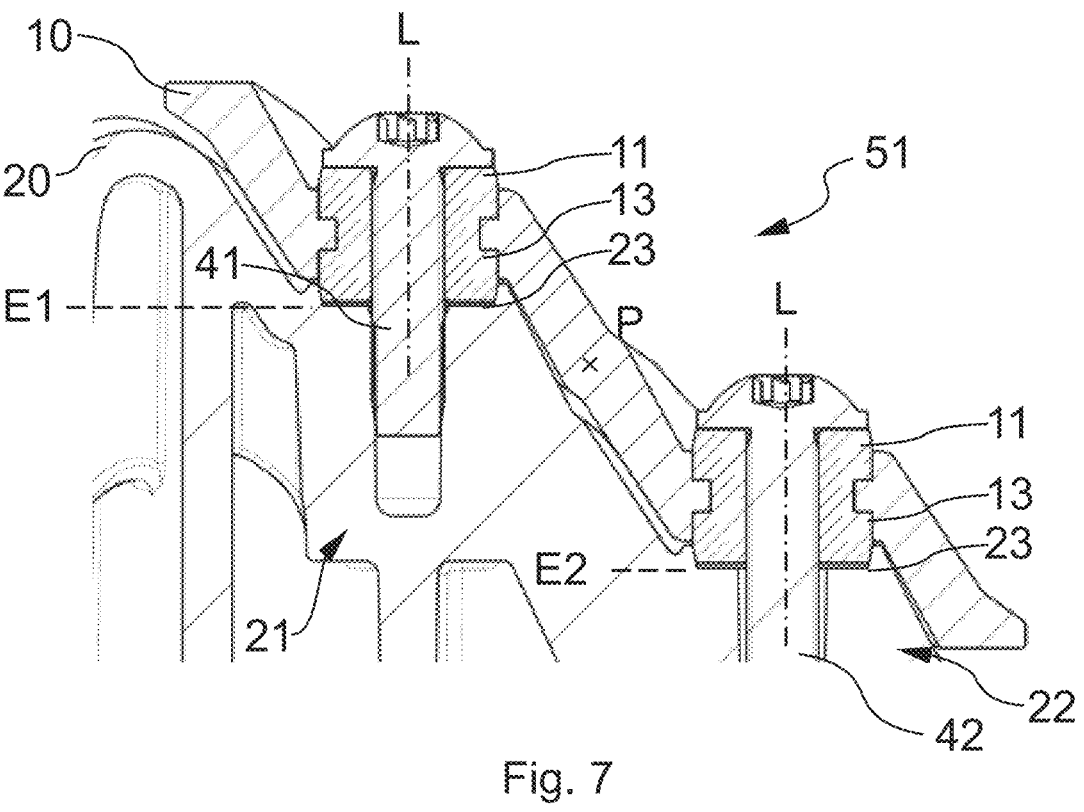
FIG. 7 shows a section through a fastening portion of an alternative variant of a fan wheel.
Figure 8:
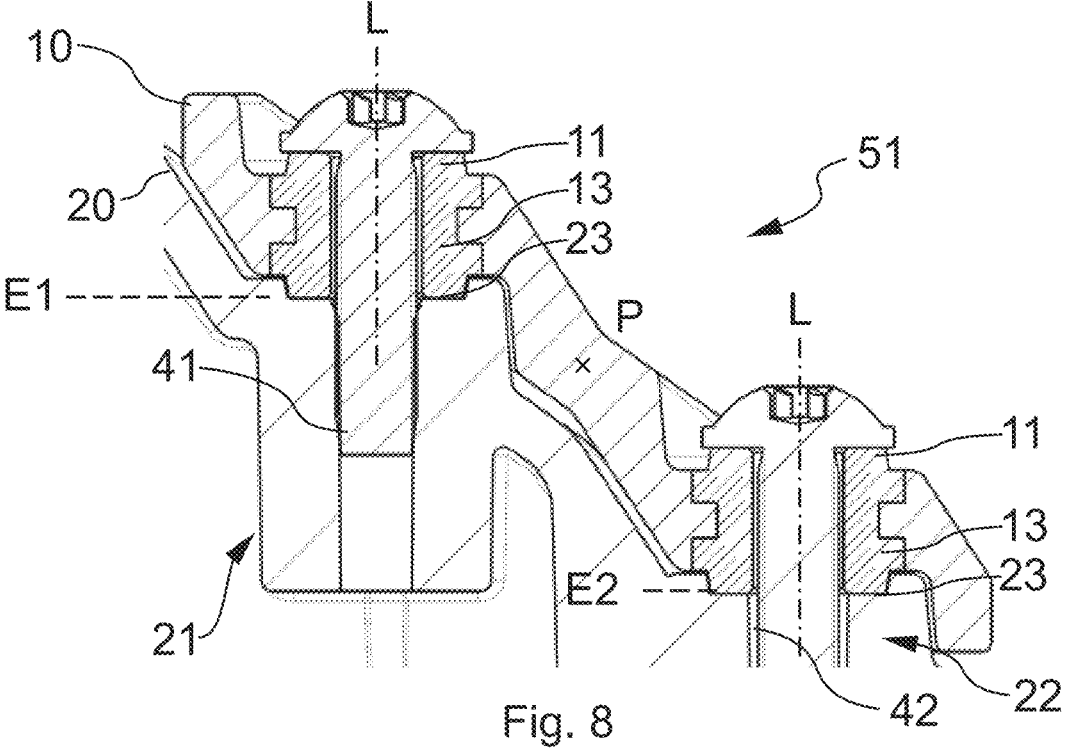
FIG. 8 shows a section through a fastening portion of an alternative variant of a fan wheel.

FIGS. 7 and 8 each show a sectional view through a fastening portion 51 of two further variants in detail, illustrating in particular the metal inserts 11, the domes 13 formed integrally by the metal inserts 11, and the corresponding recesses 23 in the respective fan wheel hub 20.

According to the variant of FIG. 7, a provision is made that the domes 13 and the corresponding depressions 23 are designed to abut one another exclusively via their respective lateral surfaces, so that the respective top surfaces are spaced apart from one another even in the assembled state. This enables the domes 13 to be centered in the respective recesses 23 and the fan wheel blades 10 to be aligned with respect to a position in the radial direction R and circumferential direction U around the rotation axis X and fixed without backlash.

Deviating from this, according to the variant as shown in FIG. 8, a provision is made that the domes 13 and the depressions 23 rest substantially only on their top surfaces and are not subjected to force and can only be also partially in contact with their lateral surfaces, which has the effect of the fan wheel blades 10 being aligned with respect to a position in the axial direction, i.e., along the rotation axis X.

Both for the embodiments according to FIG. 7 and according to FIG. 8, the fan wheel blades 10 and, in particular, their respective connecting portion through which the exemplary section extends are designed to be point-symmetrical with respect to the respective geometric center of gravity P, so that the fan wheel blades 10 can be turned in order to reverse the direction of conveyance.

Figure 15:
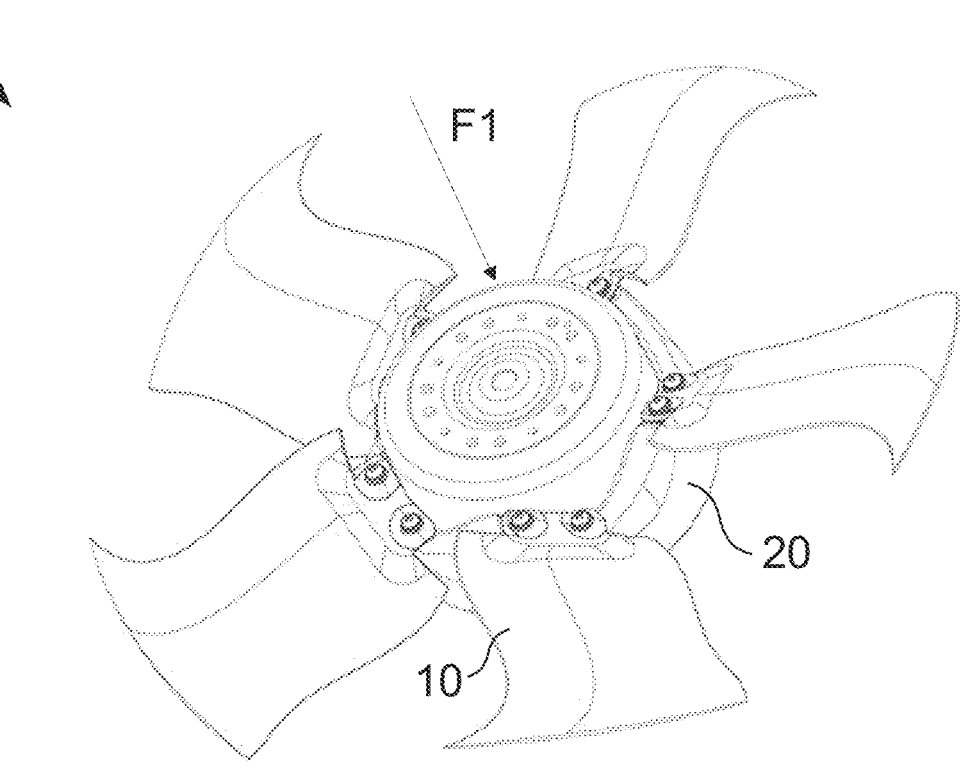
FIG. 15 shows a perspective view of a fan wheel mounted on a motor in a first fan wheel blade configuration.
Figure 16:
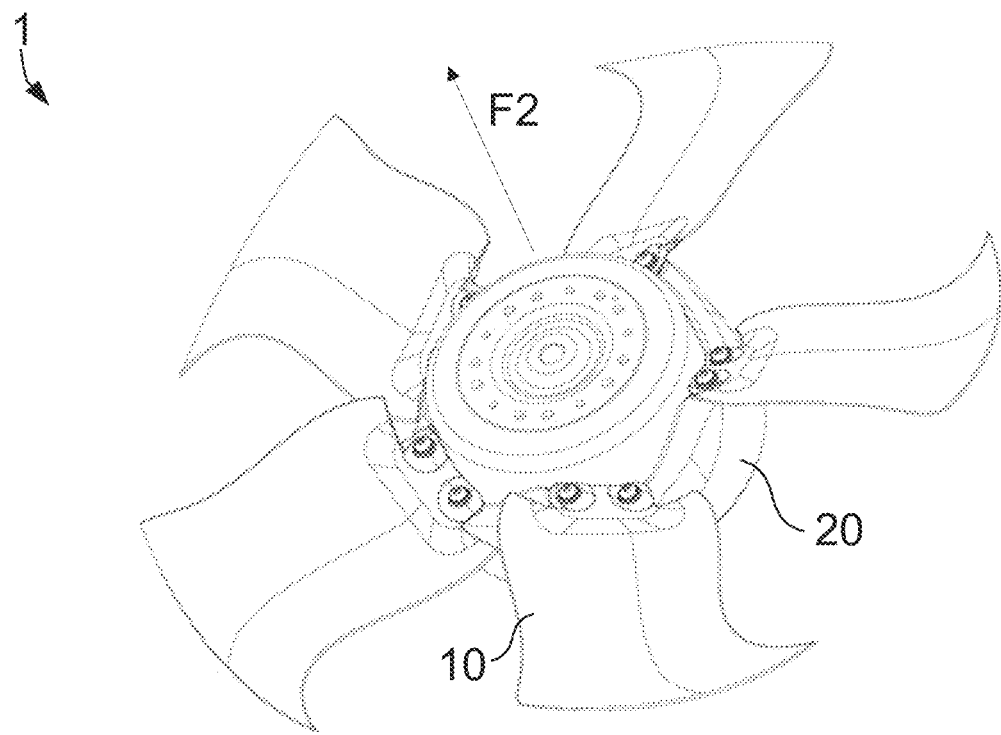
FIG. 16 shows a perspective view of a fan wheel mounted on a motor in a reversed fan wheel blade configuration.
Figure 17:
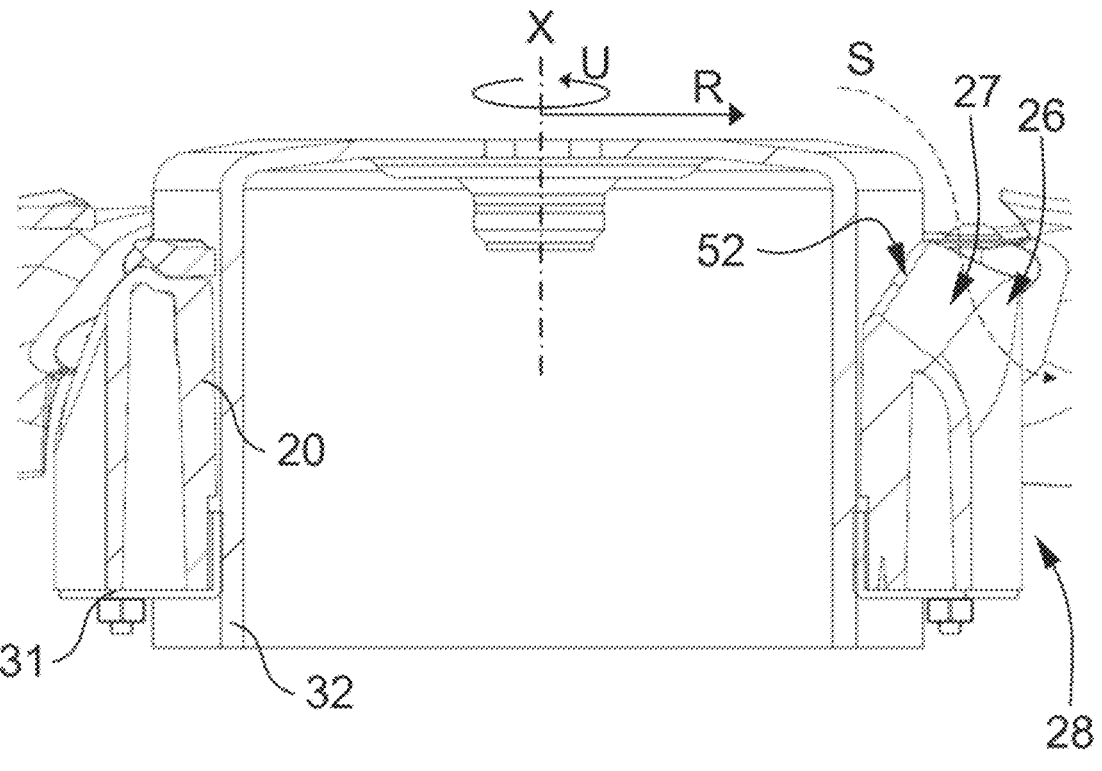
FIG. 17 shows a section through a fan wheel.

For clarification, two such configurations are shown in FIGS. 15 and 16. In FIG. 15, the fan wheel blades 10 are arranged with a first side facing toward the fan wheel hub 20, so that when the fan wheel 1 rotates, a fluid is conveyed along a first direction of conveyance F1. If the fan wheel blades 10 are now turned and mounted with an oppositely situated, second side on the fan wheel hub 20, a fluid is conveyed along an opposite, second direction of conveyance F2 when the fan wheel 1 rotates. Due to the point-symmetrical design of the connecting portions of the fan wheel blades 10, both configurations involve identical fan wheel blades 10 that are simply mounted in reverse.

Figure 9:
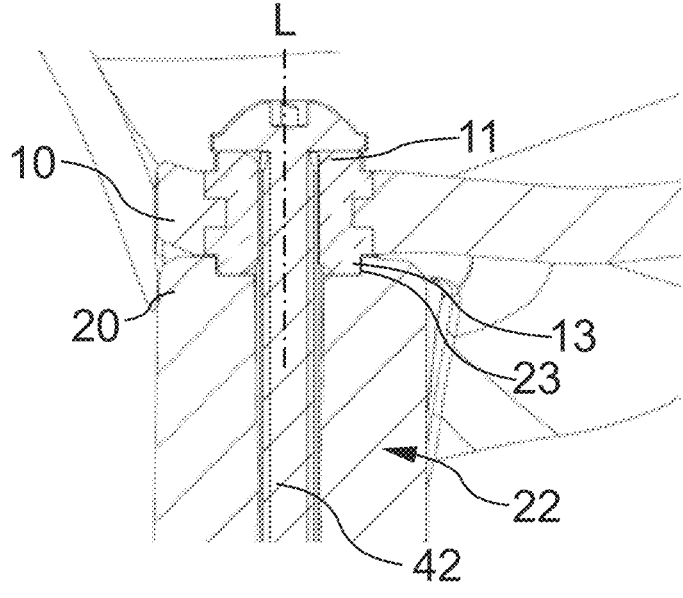
FIG. 9 shows a section through a fastening portion of an alternative variant of a fan wheel.

FIG. 9 also shows a section through a fastening portion 51 of the fan wheel hub 20 with the fan wheel blade 10 mounted thereon in detail, the section extending in the radial direction R and a design being shown of the dome 13 and the corresponding recess 23 which differs from the variants in FIGS. 7 and 8. Unlike in FIGS. 7 and 8, the dome 13 and the depression 23 do not have a frustoconical basic shape, but rather a cylindrical basic shape, and they are designed to rest substantially exclusively on their top surfaces, whereby a low-backlash assembly is achieved and the fan wheel blade 10 can be fixed with respect to its position in the axial direction.

Figure 10:
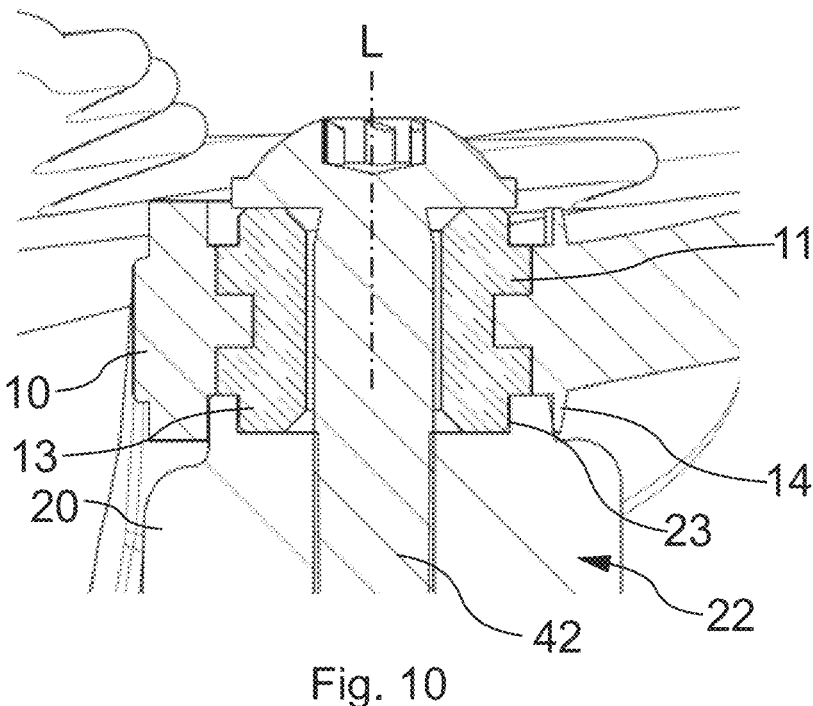
FIG. 10 shows a section through a fastening portion of an alternative variant of a fan wheel.

FIG. 10 shows a further alternative embodiment which, in particular, shows a spring element 14 which is formed integrally by the fan wheel blade 10 and is designed to be supported on the screw receptacle 22 and, in particular, on a wall or bead provided by the screw receptacle 22. As a result, the dome 13 can be brought into a predetermined position in the recess 23 and fixed therein by subsequent screwing using the screw 42. In addition, not only the dome 13 and thus the fan wheel blade 10 are brought into a predetermined position, but rather they are also pre-fixed before screwing, which greatly simplifies assembly.

Figure 11:
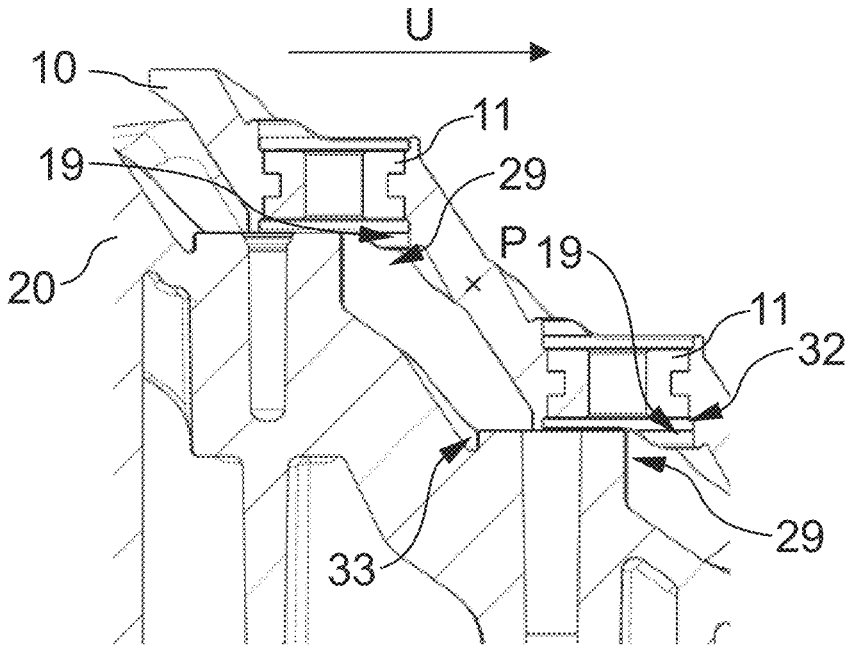
FIG. 11 shows a section through a fastening portion of an alternative variant of a fan wheel in a first state.
Figure 12:
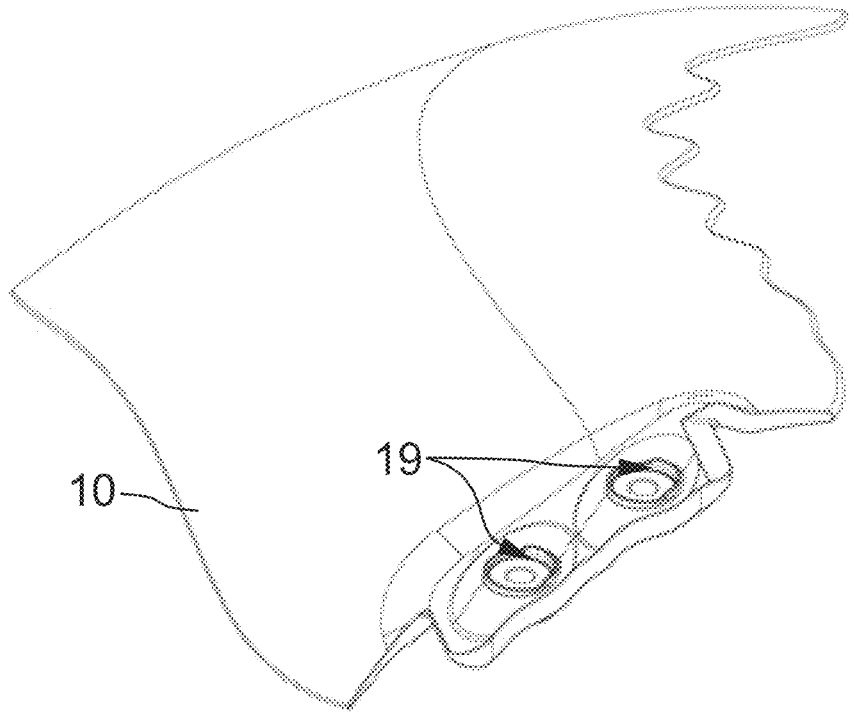
FIG. 12 shows a fan wheel blade.
Figure 13:
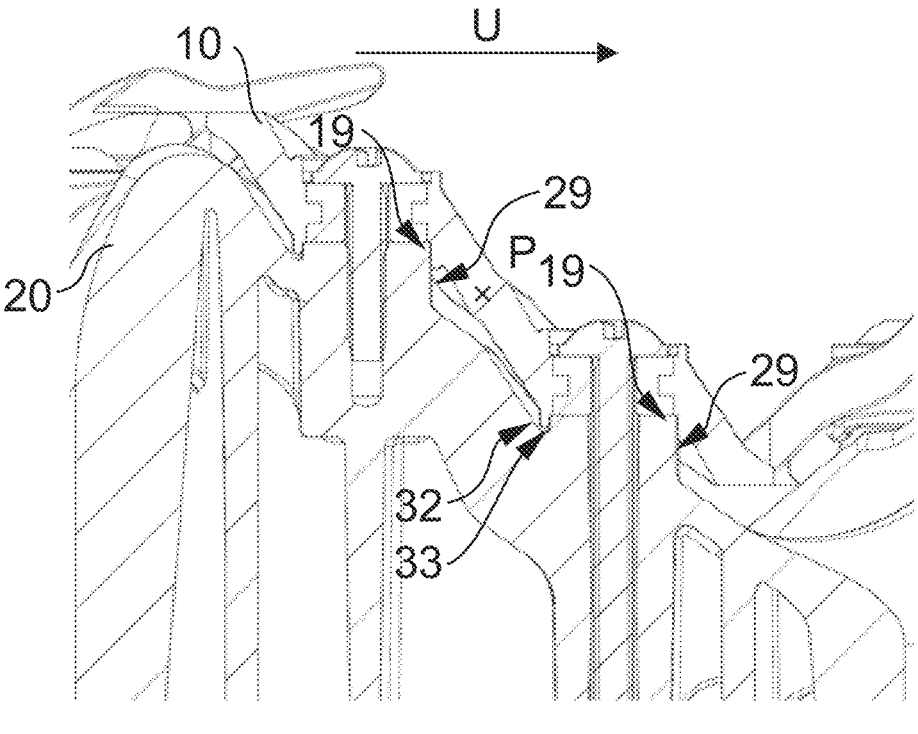
FIG. 13 shows a section through a fastening portion of an alternative variant of a fan wheel in a second state.

FIGS. 11 to 13 relate to a variant of the fan wheel 1 in which a stop 19 is provided by the fan wheel blades 10 for each screw feedthrough or each metal insert 11 and a corresponding mating surface 29 or also a stop 29 is provided on the fan wheel hub 20, so that the fan wheel blades 10 can be brought into position by the stops 19, 29 through displacement in the circumferential direction U, and clockwise in this case, in which position they can slide in the axial direction with a respective depression 32 provided on the metal inserts 11 onto a cylindrical dome 33 formed by the fan wheel hub 20.

It should be noted that the connecting portion of the fan wheel blade 10, in particular with the stops 19 provided there, is again designed to be point-symmetrical about a center of gravity P.

If a fan wheel blade 10, as shown in FIG. 12, is placed on the fan wheel hub 20 or a corresponding fastening portion 51 according to FIG. 11 and moved clockwise in the circumferential direction U, the stops 19, 29 meet one another and the fan wheel blade 10 snaps into place on the domes 33 at the predetermined position with the recesses 32, as illustrated in FIG. 13.

Figure 14:
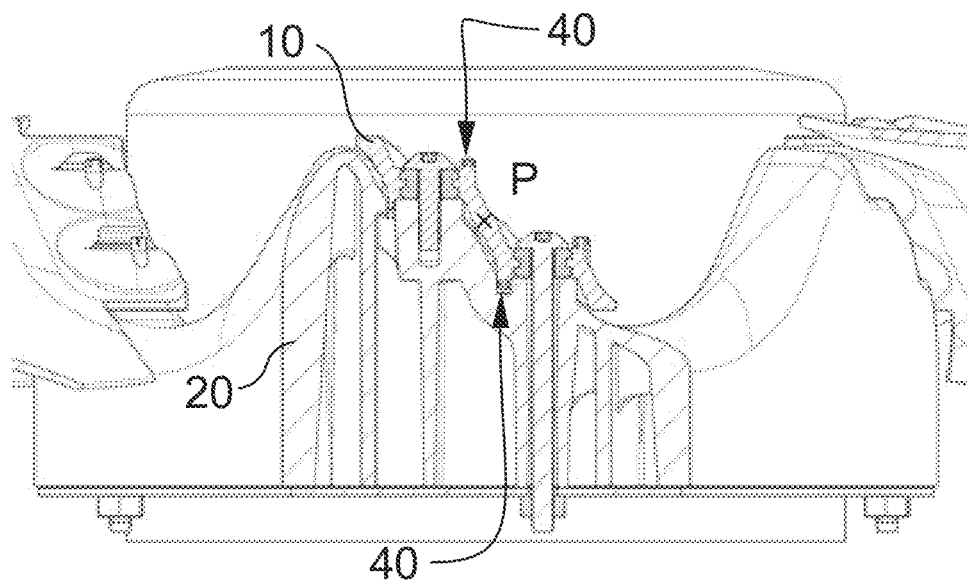
FIG. 14 shows a section through a fastening portion of an alternative variant of a fan wheel.

In FIG. 14, an indexing element 40 is also provided on the fan wheel blade 10 by means of which a specific fan wheel blade 10 is assigned a specific position on the fan wheel hub 20, enabling assembly to made fail-safe.

In order to optimize the axial flow, fluidically optimized intermediate regions 52 are provided on the fan wheel hub between the fastening portions 51 which are characterized particularly in that a radially outer lateral surface 28 of the fan wheel hub 20 extends radially inward on the front side against which the flow occurs over a rounding 26, the section adjoining the rounding 26 on the radial inside being embodied as a slope 27 which rises radially inward or, when viewed from the radially on the inside, falls radially outward, which slope 27 ends at a rotor bell 32 of the rotor. As a result, a flow striking the fan wheel 1 from the front side is optimally guided along a flow path S in the axial direction past the fan wheel hub 20.

The invention is not limited in its execution to the abovementioned preferred exemplary embodiments. Rather, a number of variants are conceivable which make use of the illustrated solution even in the form of fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to 21 included within the scope of the disclosure.

What is claimed is:

1. An axial fan wheel comprising:
a plurality of fan wheel blades and a fan wheel hub fixed to a motor in order to drive the fan wheel in rotation about a rotation axis extending centrally through the fan wheel hub;
each of the fan wheel blades can be screwed to the fan wheel hub by at least one screw with a longitudinal screw axis extending parallel to the rotation axis; and
the fan wheel hub has a corresponding screw receptacle for each of the screws for screwing to the fan wheel blades;
a rotor flange for connecting the fan wheel blade to a rotor of the motor, and
at least a part of the fan wheel blades can be screwed simultaneously to the fan wheel hub and the rotor flange by at least one of the screws with its screw longitudinal axis extending parallel to the rotation axis.

2. The fan wheel according to claim 1,
wherein at least one of the corresponding screw receptacles associated with a fan wheel blade is embodied as a blind hole extending parallel to the rotation axis where an internal thread is provided in the blind hole corresponding to the at least one screw or the at least one screw is designed as a self-tapping screw to cut the internal thread in the blind hole corresponding to the at least one screw,
and/or wherein at least one of the corresponding screw receptacles associated with the fan wheel blade is embodied as a through hole extending parallel to the rotation axis where an internal thread is corresponding to the at least one screw or the at least one screw is designed as a self-tapping screw to cut the internal thread in the through hole corresponding to the at least one screw, or a contact surface, for contacting and fixing to a connecting body having the internal thread, the connecting body is a nut or the motor.

3. The fan wheel according to claim 1,
wherein the fan wheel hub is integral with the rotor and the latter is overmolded or cast with the fan wheel hub.

4. The fan wheel according to claim 1, wherein the fan wheel blades are made of plastic and at least one screw feedthrough is embodied as a metal insert for passing through one of the screws and for contact with the at least one of the screws and/or the fan wheel hub;

and/or wherein the fan wheel hub is made of plastic and the corresponding screw receptacles are each embodied as a metal insert and for contact with a respective fan wheel blade or have said metal insert.

5. The fan wheel according to claim 1, wherein at least one first centering element is on the fan wheel hub for each fan wheel blade and a corresponding second centering element is on each of the fan wheel blades as an assembly aid and/or centering aid for fastening the fan wheel blades to the fan wheel hub in a low-backlash or backlash-free manner.

6. The fan wheel according to claim 5, wherein the at least one first centering element and/or the corresponding second centering elements are on the respective metal inserts and/or are formed integrally with the respective metal inserts.

7. The fan wheel according to claim 5, wherein the at least one first centering elements are embodied as domes and the second centering elements are embodied as depressions, wherein the domes and the depressions have a cylindrical, conical, or truncated cone-shaped basic shape, and/or wherein the domes and the depressions are each shaped and dimensioned such that a frictional and/or form-fitting connection is produced by screwing them together by the screws exclusively between their respective lateral surfaces or exclusively between their respective front top surfaces.

8. The fan wheel according to claim 5, wherein at least one spring element is on the fan wheel hub for each fan wheel blade and/or on the fan wheel blades by where the at least one first centering element can be pre-mounted and/or aligned in a respective recess.

9. The fan wheel according to claim 1, wherein the fan wheel hub has at one front end a wave-shaped profile in the axial direction along the rotation axis that is formed by alternating sections of positive gradients and negative gradients.

10. The fan wheel according to claim 9, wherein fastening portions for screwing the fan wheel blades to the fan wheel hub are provided exclusively in the sections with positive pitch or exclusively in the sections with negative pitch, in each of which at least one of the corresponding screw receptacles is provided.

11. The fan wheel according to claim 10, wherein the fastening portions each have a step-like profile, so that a positive slope or a negative slope is interrupted by at least one section lying in one plane without a rise.

12. The fan wheel according to claim 1, wherein the fan wheel hub has flow-optimized intermediate regions in the circumferential direction between fastening portions which are designed to minimize a flow resistance against a flow extending in the axial direction along the rotation axis.

13. The fan wheel according to claim 1, wherein corresponding indexing elements are provided on at least one of the fan wheel blades and on the fan wheel hub which are designed to assign a specific position on the fan wheel hub to a specific fan wheel blade.

14. The fan wheel according to claim 1, wherein at least one stop on the fan wheel hub for each fan wheel blade and/or on each of the fan wheel blades that limits the displaceability of the fan wheel blades in the circumferential direction when mounted on the fan wheel hub.

15. The fan wheel according to claim 1, wherein the fan wheel blades each have a connecting portion for screwing to the fan wheel hub, and the connecting portions are each formed point-symmetrically in cross section about a point located centrally in the cross section of the respective connecting portion, so that the fan wheel blades can be mounted on the fan wheel hub with both a first side of the connecting portions and an oppositely situated, second side of the connecting portions facing toward the latter, and the fan wheel blades can be mounted on the fan wheel hub in a flipped position in order to reverse a direction of conveyance.

16. An axial fan wheel comprising:

a plurality of fan wheel blades and a fan wheel hub fixed to a motor in order to drive the fan wheel in rotation about a rotation axis extending centrally through the fan wheel hub;

each of the fan wheel blades can be screwed to the fan wheel hub by at least one screw with a longitudinal screw axis extending parallel to the rotation axis; and the fan wheel hub has a corresponding screw receptacle for each of the screws for screwing to the fan wheel blades;

wherein the fan wheel blades are made of plastic and at least one screw feedthrough is embodied as a metal insert for passing through one of the screws and for contact with the at least one screw and/or the fan wheel hub;

and/or the fan wheel hub is made of plastic and the corresponding screw receptacles are each embodied as a metal insert and for contact with a respective fan wheel blade or have said metal insert.

* * * * *